United States Patent
Clarke

[19]

[11] Patent Number: 6,014,232
[45] Date of Patent: Jan. 11, 2000

[54] ELECTRICAL DEVICE COMPRISING AN ARRAY OF PIXELS

[75] Inventor: John A. Clarke, Carshalton, United Kingdom

[73] Assignee: U.S. Philips Corporation, New York, N.Y.

[21] Appl. No.: 08/924,802

[22] Filed: Sep. 5, 1997

[30] Foreign Application Priority Data

Sep. 7, 1996 [GB] United Kingdom .................... 9618720

[51] Int. Cl.[7] .............................. H04N 1/40; G02B 27/10
[52] U.S. Cl. .......................... 358/482; 358/471; 359/622
[58] Field of Search .................................. 358/471, 474, 358/482, 483; 359/263, 254, 318, 435, 622; 250/201.8, 208.1, 204, 332; 345/32; 356/237, 376

[56] References Cited

U.S. PATENT DOCUMENTS

| | | | |
|---|---|---|---|
| 4,321,628 | 3/1982 | Crean | 358/481 |
| 5,052,783 | 10/1991 | Hamada | 349/5 |
| 5,719,706 | 2/1998 | Masumoto et al. | 359/622 |
| 5,751,387 | 5/1998 | Iigahama et al. | 349/95 |

FOREIGN PATENT DOCUMENTS 0576144  12/1993  European Pat. Off. .

OTHER PUBLICATIONS

"Microlens Arrays", by M. Hutley et al., in Physics World, Jul. 1991, pp. 27–32.

*Primary Examiner*—Kimberly A. Williams
*Attorney, Agent, or Firm*—F. Brice Faller

[57] ABSTRACT

An electrical device comprising an array of pixels has a plurality of panels 10, 20, 30, each having a respective sub-array of pixels 11. Each panel 10, 20, 30 is associated with an array 40 of lens elements 42, which may be associated with a group of one or more pixels of the sub-array. The lens elements 42 are arranged with a pitch which is greater than the pitch of the associated group of pixels, so that a diverging image is produced, enabling tiling of panels of an image sensor or of a display device.

20 Claims, 14 Drawing Sheets

ELECTRICAL DEVICE COMPRISING AN ARRAY OF PIXELS

BACKGROUND OF THE INVENTION

This invention relates to electrical devices having arrays of pixels, for example liquid crystal displays or optical image sensors. The invention is particularly concerned with devices having arrays of pixels which are divided into sub-arrays.

In order to make possible the manufacture of large area arrays, it is known to form a device from a plurality of sub-arrays of pixels which are arranged beside each other in order to provide a large composite array. The known problem arises, both for image sensors and for displays, that it is desirable to disguise the join between the sub-arrays. Generally, this may be achieved in one of two ways. One possibility is to use sub-arrays which may be abutted together, whilst maintaining a uniform pixel pitch across the join. Obviously, this requires very accurate machining of the sub-arrays, particularly when the pixel dimensions are to be reduced to a minimum size, to increase the resolution of the device. Also, electrical connections to peripheral circuitry can not be made along abutting edges, restricting the number of sub-arrays that can be used. The alternative possibility is to employ an optical system, which enables the sub-arrays to be slightly spaced apart. The present invention concerns an optical solution to the problem of tiling a plurality of sub-arrays to enable the manufacture of a larger array.

The basic principle underlying the use of an optical system to enable tiling of sub-arrays is that the optical system should provide an optical enlargement of each sub-array, so that the image of the sub-arrays produced by the optical system constitutes a uniform image, and the joins between the sub-arrays have been eliminated. In other words, in the case of a display, an enlarged view of the sub-arrays is viewed, and in the case of an image sensor, the image to be sensed is divided into portions which are reduced in size for sensing by the sub-arrays.

Figure 1:
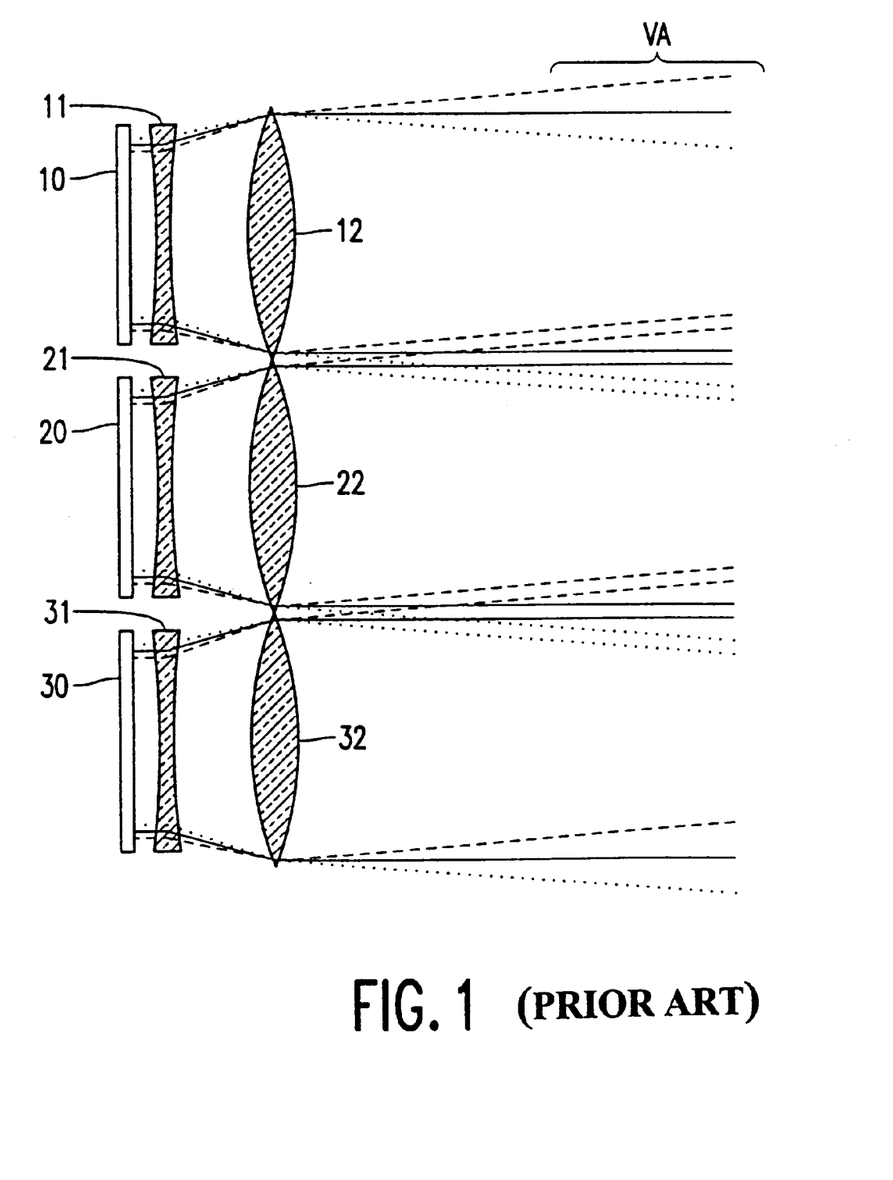
FIG. 1 shows a conventional telescope arrangement for optical enlargement, the arrangement being applied to sub-arrays.

This basic concept of optical enlargement could, for example, suggest the use of the arrangement employed in a Galilean telescope, as represented schematically in FIG. 1. Three sub-arrays are represented as 10, 20 and 30, each having an associated diverging lens 11, 21, 31 and an associated converging lens 12, 22, 32. Such an arrangement can maintain parallel beams at the output of the converging lenses, whilst providing enlargement. However, the image seen from the viewing area VA is an enlarged virtual image of each sub-array 10, 20, 30. For a display, this presents the problem that the range of viewing angles may be limited, because viewing from different angles will result in some loss of the image at the boundaries, since these images are virtual and may be partially hidden by the lens apertures. In the case of an image sensor, imaging must take place at the real optical focus of the optical system, so the arrangement of FIG. 1 will only work if a supplementary optical system is provided to image the document at the virtual image plane.

U.S. Pat. No. 4,321,628 discloses an image scanning system in which a linear array of photosensitive elements is divided into sub-arrays which are spaced apart. Each sub-array is associated with a pair of converging lenses which effectively focus a non-inverted image of the sub-array onto a platen 10, where a document can be placed for scanning. The sensor arrangement of U.S. Pat. No. 4,321,628 requires converging lenses of sufficient power to produce a focused image of each entire sub-array at the platen, and this imposes a significant distance between the array and the document to be sensed. Size constraints are, of course, equally important in the case of displays where the overall depth of a display panel is to be maintained as small as possible.

SUMMARY OF THE INVENTION

According to the present invention there is provided an electrical device comprising an array of pixels, and having a plurality of electrical panels, each panel providing a respective sub-array of pixels, an array of lens elements being associated with each panel. Each lens element is associated with a group of one or more pixels of the sub-array, the lens elements being arranged with a pitch which is greater than the pitch of the associated groups of pixels.

In accordance with the invention, a lens array is provided over each sub-array of pixels, and the lens array covers a greater area than the area of the sub-array (by virtue of the greater pitch). The general outline of the lens array is similar to the panel shape, for example a square lens array over a square panel, or a rectangular lens array over a rectangular panel.

The lens elements preferably comprise microlens elements. For example, a microlens may be associated with each pixel, in which case the pitch of the microlenses is greater than the pitch of the pixels. Alternatively, a microlens may be associated with a group of pixels, for example a square of n×n pixels. In this case, the pitch of the microlenses is greater than n times the pitch of the pixels. The "pitch of associated groups of pixels" as referred to above and in the following description and claims is intended to indicate n times the individual pixel pitch, where the group of pixels has a dimension of n pixels. Although described as square, the group of pixels could be rectangular, hexagonal or some other shape. The value of n, when referring to a dimension of n pixels, does not have to be an integer.

The greater pitch of the lens elements results in the microlens array thereby receiving a diverging image from the sub-array of pixels (or producing a converging image to the sub-array of pixels). This gives rise to a focused real image of the sub-array which is greater in size than the sub-array, thereby enabling tiling to form a large area imaging or display device.

Each panel may comprise a converging field lens associated with all pixels of the sub-array, the field lenses of adjacent panels substantially abutting one another, and having the same general shape as the respective panel, for example a square field lens associated with a square panel. This enables the light beams incident upon, or emitted by, each pixel of the sub-array to travel substantially perpendicularly to the plane of the sub-array in the active area of the device. For the purposes of this description, the active area is defined as the viewing area of a display, or the area in which a document to be imaged is positioned for an image sensor.

The microlens array and the respective field lens may be combined as a single unit, by providing the array of lens elements on a face of the field lens.

A diverging lens may be provided adjacent each panel between the respective panel and the lens array, and associated with all pixels of the sub-array. This ensures that light is incident to, or emitted from, each pixel substantially normally or at the same angle. This gives better contrast in the case of a display, and improved light collection in the case of an image sensor.

A non-inverting lens arrangement may be associated with each panel, the non-inverting lens arrangement including the lens array and at least one further lens array, the lens elements of the lens array and the at least one further lens array being arranged with different pitches, each greater than the pitch of the associated group of pixels. The use of a non-inverting lens arrangement simplifies the alignment of the lens arrangement with the panels.

As described above, the electrical device of the invention may comprise a display or an image sensor. In either case, each lens element is preferably associated with a plurality of pixels. Each panel may comprise a further array of lens elements arranged such that light incident on or emitted by each pixel of the panel is substantially telecentric in the active area of the device. This enables light beams associated with each pixel to project perpendicularly to the plane of the sub-array, in the active area of the device.

The lens elements of the lens array may have a diameter substantially corresponding to their pitch, so that the lens elements substantially abut one another. This is preferred with displays, where a large field of view is desired. A diffusing surface may also be included to increase the field of view.

However, for image sensors, the diameter of the lens elements may be less than the pitch of lens elements with at least a portion of the space between the lens elements being filled with opaque material. Thus, the open aperture of each lens element may be reduced, and this has the advantage of improving the depth of focus for an image sensor, for example in document scanning applications.

In addition, means may be provided for blocking the passage of light between each pixel and regions of the active area other than a region associated with the respective pixel. This avoids the appearance of ghost images in a captured image, or improves the quality of a displayed image. This means may comprise blocking arrangements of opaque material, and/or aperture arrays.

DETAILED DESCRIPTION OF THE PREFERRED EMBODIMENTS

Figure 2:
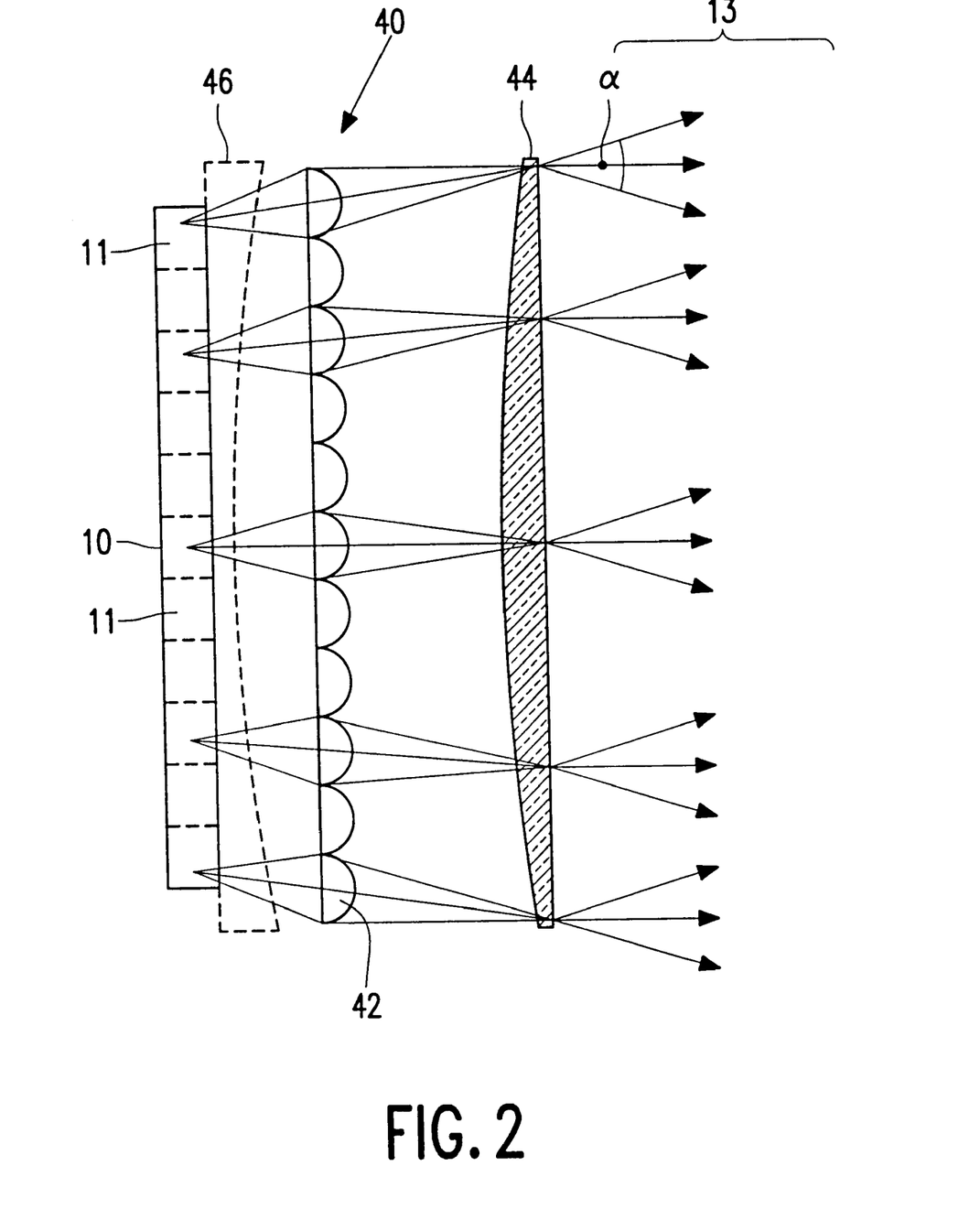
FIG. 2 shows a panel and associated optical arrangement of an electrical device according to the invention.

FIG. 2 shows the optical arrangement associated with one panel 10, having a sub-array of pixels 11, and which provides an optical enlargement of the sub-array in the active area 13. This enlargement may of course equally be considered as a reduction for light travelling in the opposite direction. As a result, the invention is equally applicable to tiled image sensors as to tiled displays. In the following description, advantages of a particular feature may be described with reference only to one of these two applications of the invention. These advantages will normally be equally applicable to both image and display applications, unless particular considerations apply.

For the purposes of tiling, the enlargement described above may be used to produce an enlarged image of display panels so that a continuous real image may be produced of spaced panels. Alternatively, portions of a complete continuous image in the active area 13 may be scaled down by the optical system to enable these portions to be sensed by different spaced image sensing panels.

In general terms, the invention provides a lens array 40 associated with the sub-array of pixels of each panel 10, and which comprises an array of individual lens elements 42. The lens elements may comprise shaped microlenses. However, other forms of small scale converging lens element may be employed, for example graded-index lenses (which rely upon non-uniform refractive index within the lens element instead of relying upon the shape of the boundary between media of different refractive indices). It is equally possible to fabricate arrays of holographic lenses or of diffractive elements. These possibilities will all be evident to those skilled in the art.

In the example shown in FIG. 2, each microlens 42 can be considered to be associated with an individual pixel 11 of the sub-array. The pitch of the microlenses 42 is slightly greater than the pitch of the pixels 11, such that the microlens array 40 occupies a greater area than the area of the sub-array. The spacing of the microlens array 40 from the sub-array and the spacing from the active area are selected according to the focal length of each microlens element 42, in such a way that an image of each pixel is produced by the optical system at the surface of the display or at the surface where a document to be imaged is positioned. It is preferred that the local enlargement of each pixel by the microlenses corresponds to the global enlargement of the entire sub-array by virtue of the pitch of the microlenses. The single microlens array 40 is sufficient, to provide the required focusing and enlargement of the image of the sub-array to enable tiling of display or image sensor sub-arrays.

An additional factor influencing the desired local magnification produced by the microlenses 42 is the "open area" of the pixels. If the light responsive portion of a pixel 11 occupies a relatively small area, compared to the area of the panel 10 associated with that pixel, then an increased magnification of the microlenses 42 may be desirable so that the output of the display is continuous, or an image sensor receives signals representing the entire image to be sensed.

Microlens arrays are known, and the microlens array used in the present invention may be formed by known techniques. The precise technique to be adopted will depend upon the size of the microlens elements to be adopted.

If a microlens is to be associated with each pixel, very small microlenses are required. In such a case, it is known to form shaped lens elements of diameter as low as 50 $\mu$m from reformed thermoplastic resin. For this purpose, a substrate of the array 40 (usually glass) is coated with a thermoplastic resin layer, which may be applied by means of spin coating. Subsequent patterning of the thermoplastic resin may be carried out by means of photolithography. This gives a thermoplastic resin layer having discrete portions, each corresponding to an individual microlens 42, in the desired positions. Thermal reflow of the resin layer at a pre-determined temperature causes the thermoplastic resin to reform in a convex lens shape.

Various methods for producing microlens arrays, whether shaped, graded-index, or diffractive, are described in the article "Microlens Arrays" in Physics World July 1991, pages 27–32. Those skilled in the art will be familiar with the methods by which microlens arrays may be formed.

If a group of pixels is associated with each microlens, it will be possible to increase the size of each microlens to enable less expensive fabrication techniques. In this case, the shaped microlens array may be formed by known mould techniques. For example, a mould may be formed by creating indentations in a metal plate, and this mould may be used to make plastic lenses on a glass substrate or a plastic sheet.

As can be seen in FIG. 2, the effect of the microlens array 40 covering a larger area than the sub array of pixels 11 of the panel 10 is to cause divergence of the signals from the sub-array. It may be desirable to deflect the diverging beams to a substantially normal direction, and this can be achieved by using a field lens 44, which is a converging lens having a power suitable to deflect the beams from the microlenses 42 (or at least the beams on the optical axes of the microlenses 42) to substantially normal parallel beams.

This field lens (and any other lenses described below having a size commensurate with the size of the panel) may be formed by known moulding techniques in the case of plastic lenses, or known grinding and polishing operations in the case of glass lenses. The field lenses abut one another to form the continuous display surface or imaging surface.

In the case of a display, greater image contrast is sometimes obtained by viewing the display from a certain direction, for example with Liquid Crystal Displays. It may therefore be desirable to view light from the pixels which has been emitted normally to the sub-array of pixels 11 or at a predetermined angle through the sub array. For this purpose, it may be desirable to introduce a diverging lens 46 adjacent the sub-array, such that the light directed to the microlenses 42 are deflections of beams which have been emitted normally or at a predetermined angle from the sub-array. Displacement of the optical axis of the lens 46 away from the centre line of the panel will alter the predetermined angle. Likewise, light entering an image sensing pixel normally is less likely to be attenuated through absorption or reflection before reaching the light responsive surface of the pixel.

Another important design parameter which influences the individual microlens design is the desired spread of light within the active area 13. The shorter the focal length of the microlenses, for a given diameter microlens, the thinner will be the display or image sensing module, which is of course desirable. However, a shorter focal length leads to an increased angle of spread, $\alpha$ shown in FIG. 2.

In the case of a display, a higher value of $\alpha$ will result in a greater range of viewing angles. The value of $\alpha$ may also be further increased by making one surface of the lens 44 to be a diffuser. However, in the case of an image sensor a reduction in the value of $\alpha$ is desired so that the depth of focus is improved.

One way to improve the depth of focus for an image sensor is to reduce the open area of each microlens 42, for example by having smaller microlens elements 42 surrounded by opaque material. This is shown in embodiments described below.

Figure 3:
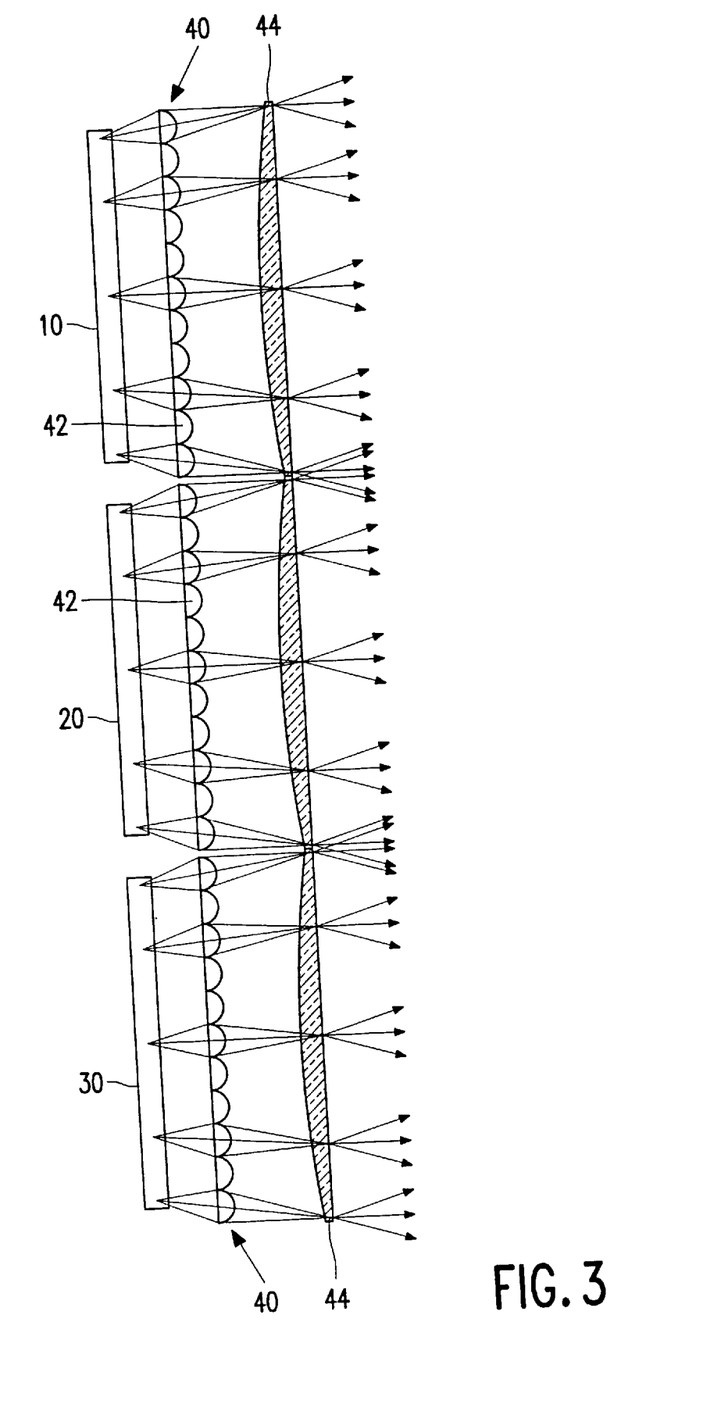
FIG. 3 shows a device according to the invention comprising three of the panels of FIG. 2.

FIG. 3 shows three of the sub-arrays of FIG. 2 arranged side by side, with the sub-arrays 10, 20, 30 spaced apart from one another, and with the optical system producing a continuous image. This enables imaging of a large area using small sub-arrays of image sensing elements, or enables tiling of images from small display panels to form a continuous large image.

When the tiled system shown in FIG. 3 is used as a display, a real tiled image is formed at the surface of the field lenses 44. This enables an improved field of viewing angles for the display without losses at the boundary. To improve the quality of the image at the join of sub-arrays, information displayed by boundary pixels may be duplicated as represented in FIG. 3. To achieve uniform brightness it may be necessary to display signals of the boundary of each sub-array with a modified intensity.

Figure 4:
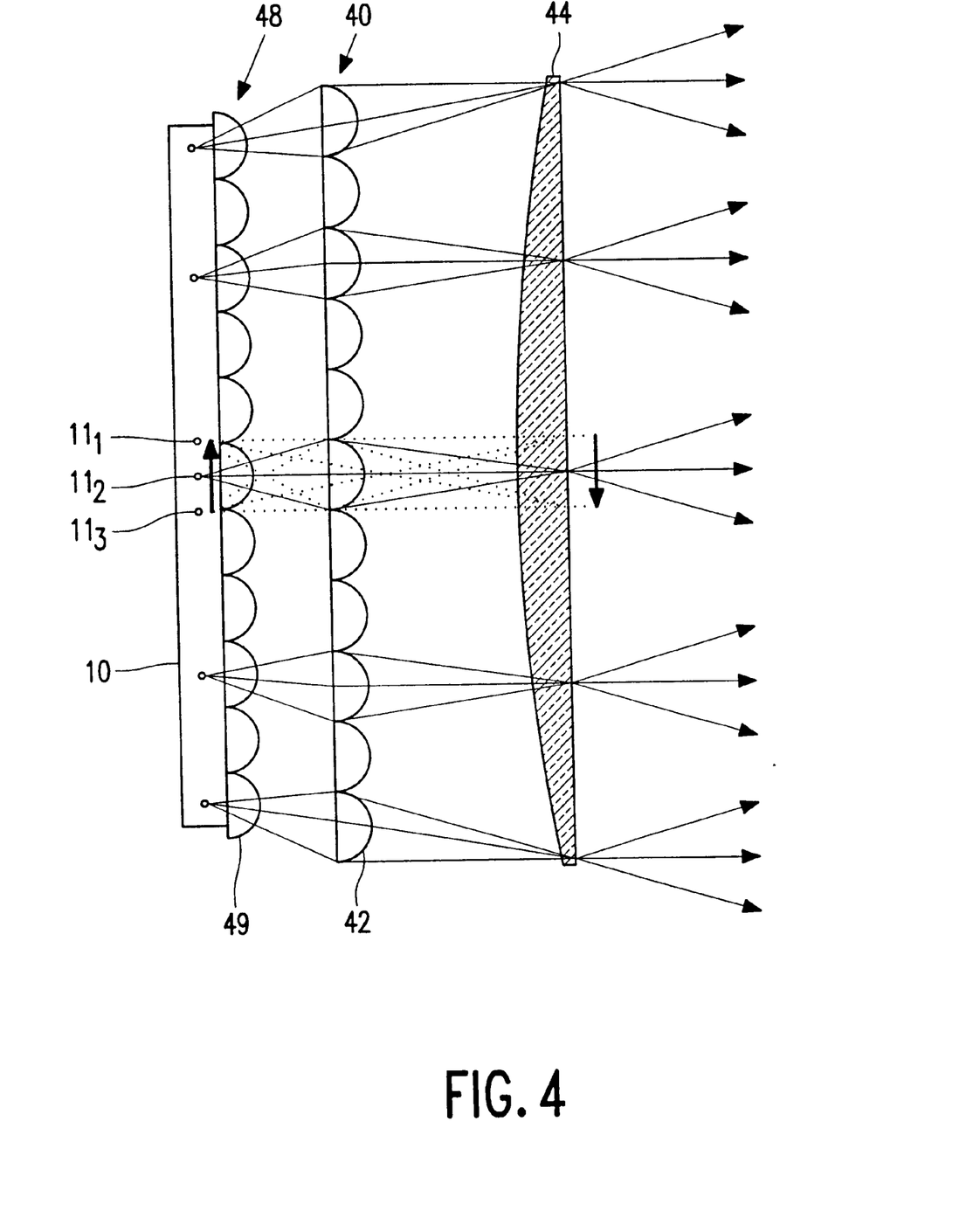
FIGS. 4 to 14 show various modifications to the optical arrangement associated with each panel.

One problem with the optical system associated with the sub-array shown in FIG. 2 is that a single microlens 42 is required for each pixel 11 of the display or image sensor. Where, for example, high resolution image sensing is desired, this will require microlenses of very small dimensions, which may be difficult to fabricate, as discussed above. One of the possible ways to overcome this is for each microlens 42 to be associated with more than one pixel of the sub-array. For example, each microlens 42 may be associated with a square group of pixels, for example 3×3 pixels $11_1$, $11_2$, $11_3$ . . . , as shown in FIG. 4. This reduces the number of microlenses required in the microlens array 40, but of course locally inverts the numbering of the row and columns which requires some signal processing. This is also represented in FIG. 4 using the arrow symbol. For simplicity, each group of pixels has been shown as 3×3 pixels. Of course, a group of pixels may include many more pixels, enabling an increase in the size of each lens element.

FIG. 4 also shows an additional microlens array 48 adjacent the sub-array 10. When each microlens 42 is associated with more than one pixel, the light to or from each pixel enters or leaves each pixel at a different angle. This gives different contrasts for the signals produced by different display pixels associated with each microlens, or gives different light collecting efficiency for different image sensor pixels associated with each microlens. The second microlens array 48 has lens elements 49 of greater pitch than the groups of pixels of the sub-array, and ensures that light enters or leaves each pixel from substantially the same range of directions. This is represented schematically in FIG. 5.

Figure 5A:
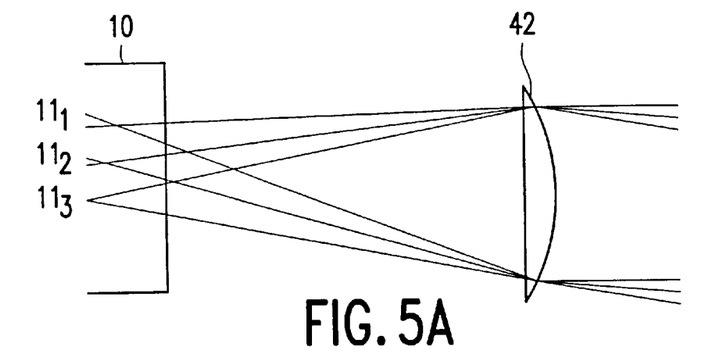
Figure 5B:
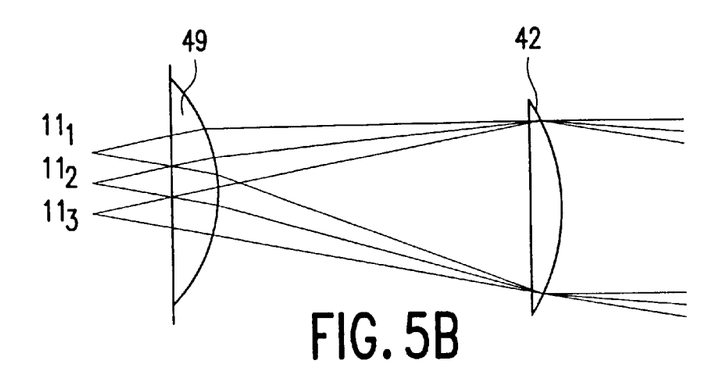
Figure 5C:
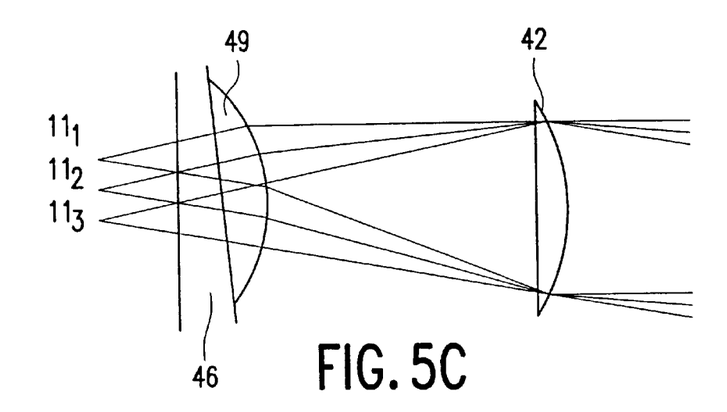

In FIG. 5 part A, pixel $11_3$ receives or emits light almost normally, whereas pixel $11_1$ only receives or emits light at a significant angle to the normal. The additional microlens 49, shown in FIG. 5 part B results in substantially equal entry/departure angles for each pixel in the group. In a preferred embodiment, the microlens array 49 may be combined with the diverging field lens 46 of FIG. 2. This enables parallel beams to enter or be emitted by each pixel, and centred normally to the sub array of pixels 11, as shown in FIG. 5 part C.

Figure 6:
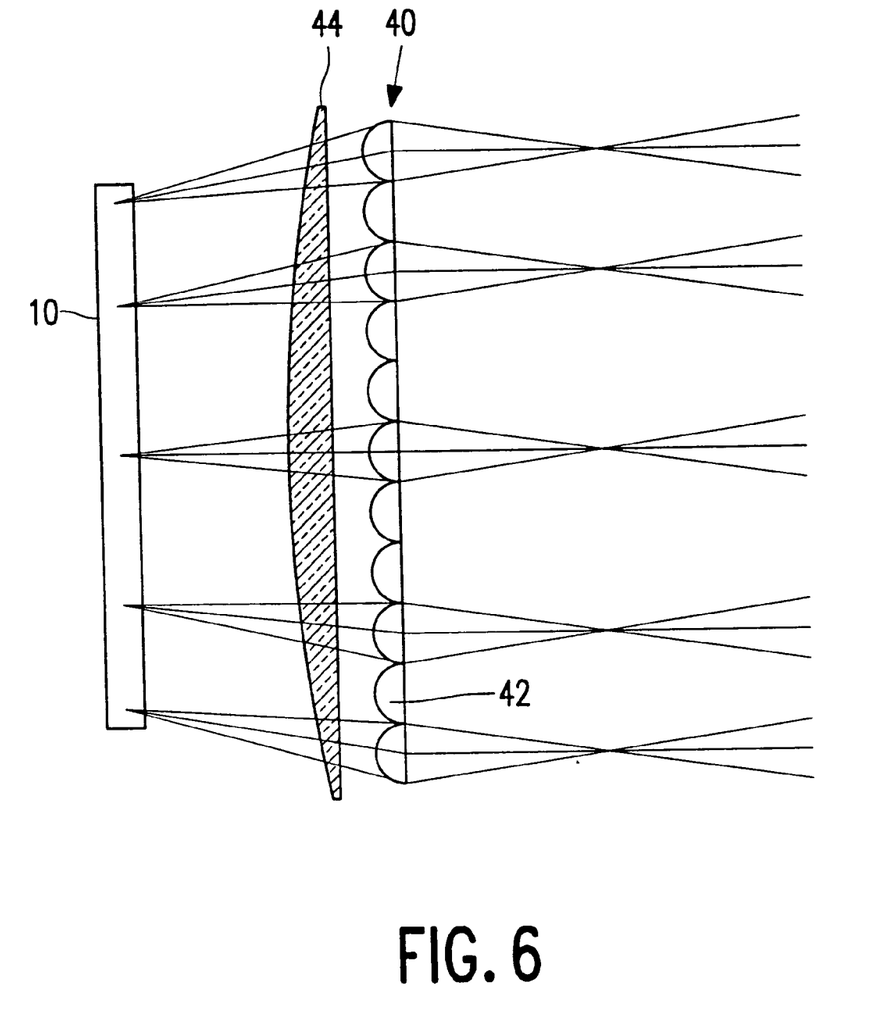

FIG. 6 shows an alternative arrangement to that of FIG. 2, in which the field lens 44 and microlens array 40 have been positioned in the opposite order with respect to the panel 10. The arrangement which is desired will depend upon the ease of manufacture. In FIG. 6 the microlenses are positioned with opposite orientation to those of FIGS. 2 to 4 so that a flat substrate of the microlens array may provide a document imaging platen, in the same way that a flat surface of the field lens 44 in FIG. 4 may also be used as a document imaging surface.

Figure 7:
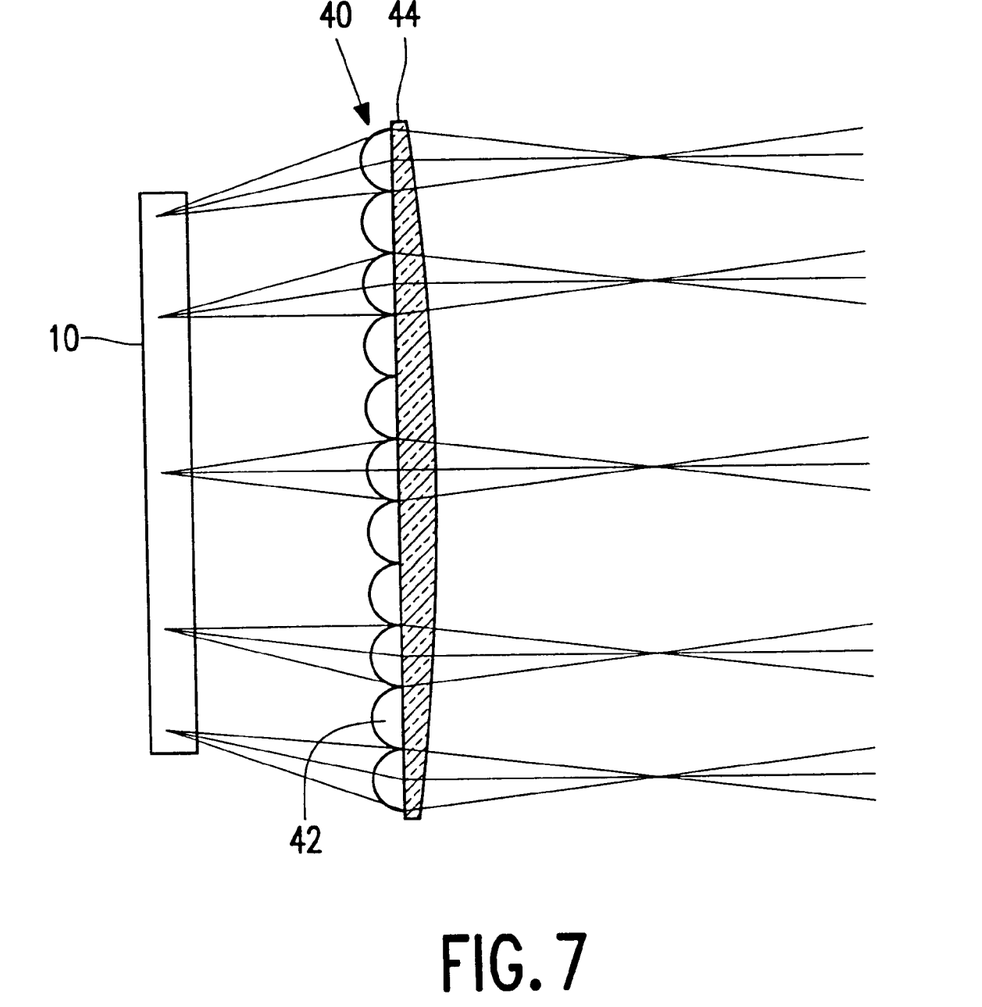
Figure 8:
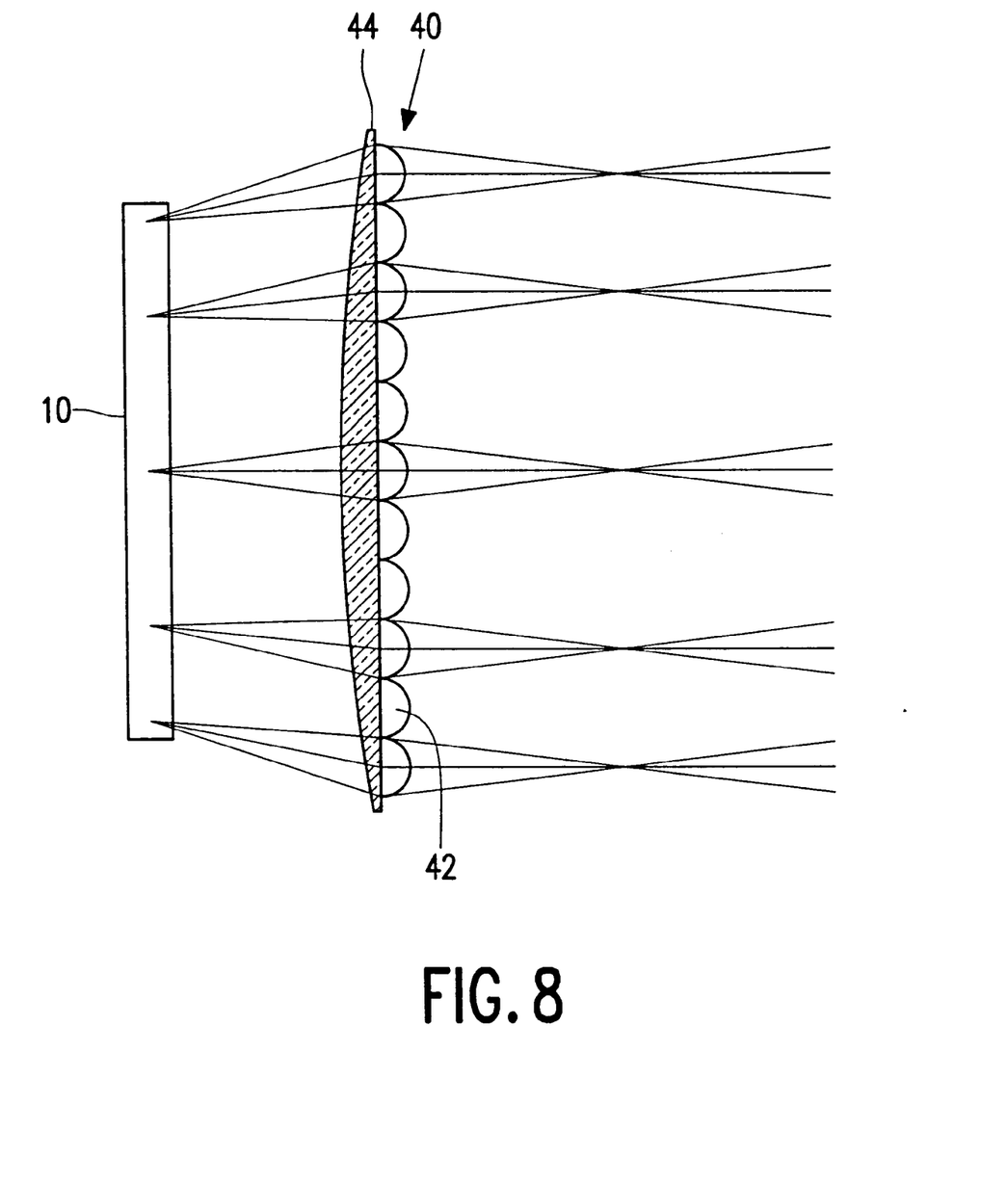

The field lens 44 and microlens array 40 may be combined as a single unit as shown in FIG. 7 and 8, with the flat surface of the field lens 44 acting as the substrate for the microlens array 40, or as a surface to which the microlens array module may be bonded.

Figure 9:
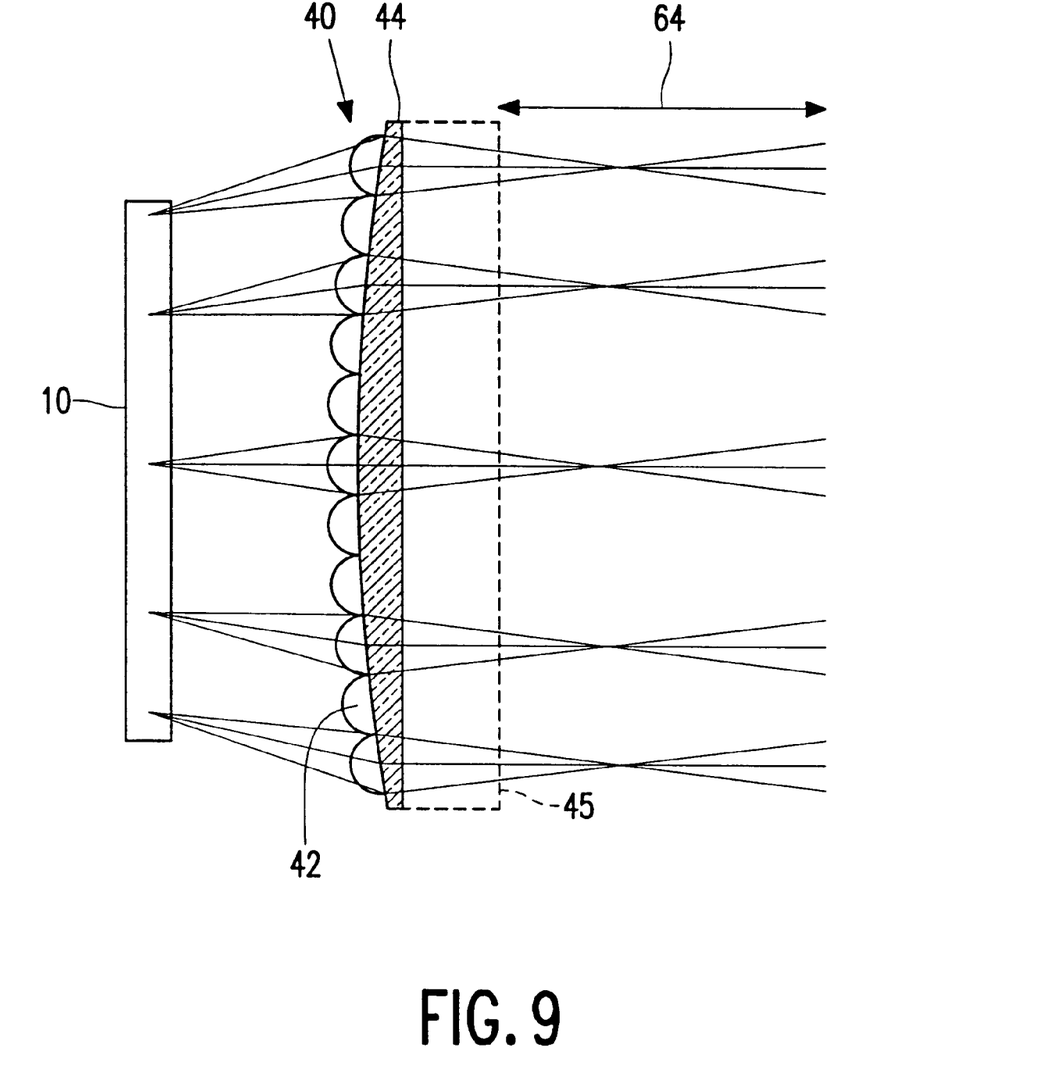

If a flat outer surface is desired for providing a document imaging platen, then the microlenses could be combined on the curved surface of the field lens 44 as shown in FIG. 9. The field lens may be supported on a relatively thick window 45, which may act as a locating surface for a document to be imaged. This will ensure that a document to be imaged will be positioned within the depth of focus 64, shown in FIG. 9.

This depth of focus is an important consideration for document scanning applications, because even if a document is deformed (creased) in certain areas, it is desirable for all parts of the document surface to be within the range where effective focusing takes place, namely within the depth of focus. As shown in FIG. 2, improved depth of focus is obtained by reducing the angle α of dispersion of the beams.

Figure 10:
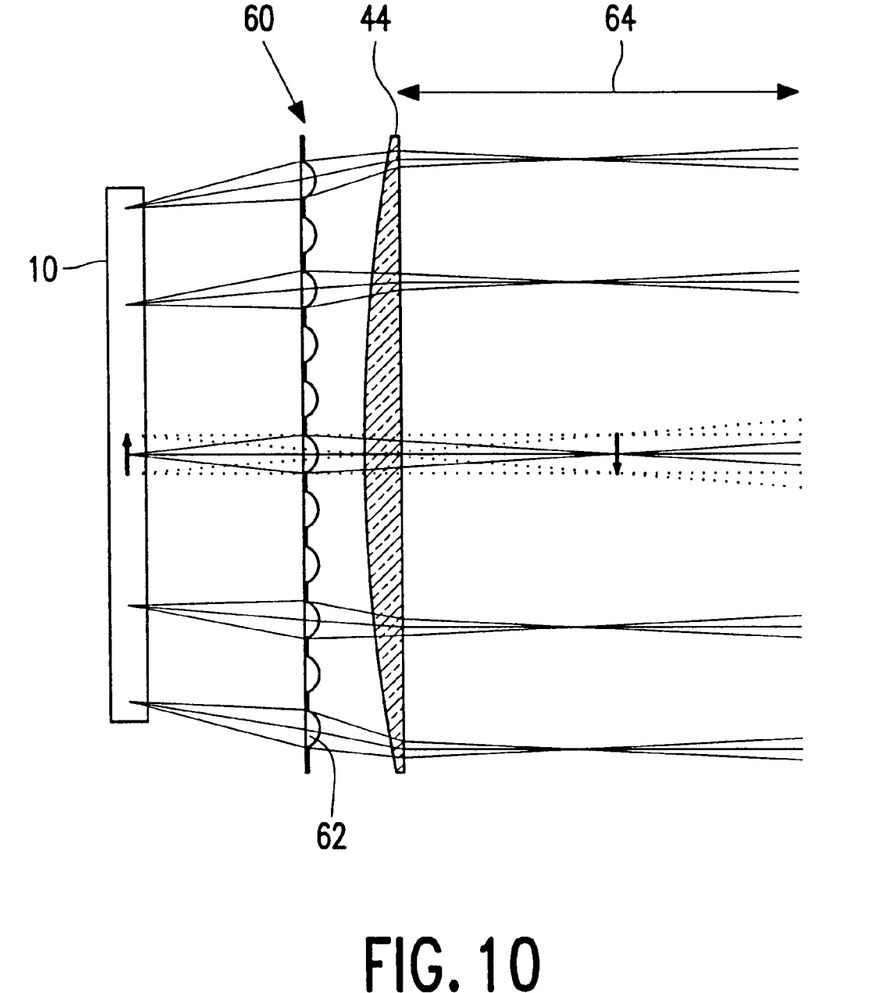

FIG. 10 shows an optical arrangement corresponding to that shown in FIG. 2 but with the microlens array 40 replaced by a microlens array 60 with spaced apart microlenses 62, the spacing being filled by opaque material. This reduces the open area of each microlens 62 and has the effect of increasing the depth of focus, which is desirable for image sensor applications. For an image sensor, an image will be focused if light received by a pixel is received uniquely from the desired portion of the image to be sensed. The depth of focus is the range within which this relationship holds true, and is approximately represented by the range 64 shown in FIGS. 9 and 10. In FIG. 10, each microlens 62 is again shown to be associated with a group of pixels of the sub-array 10, in the same way as described with reference to FIG. 4.

In the examples described, the field lens 44 serves to deflect light to form substantially parallel beams within the depth of focus 64. However, when a group of pixels is associated with each lens element, beams will not be parallel in the active area for all pixels. For example, the centre pixel associated with a lens element may correspond to a normal beam in the depth of focus, but the beams associated with the other pixels will diverge from the central normal beam.

Figure 11:
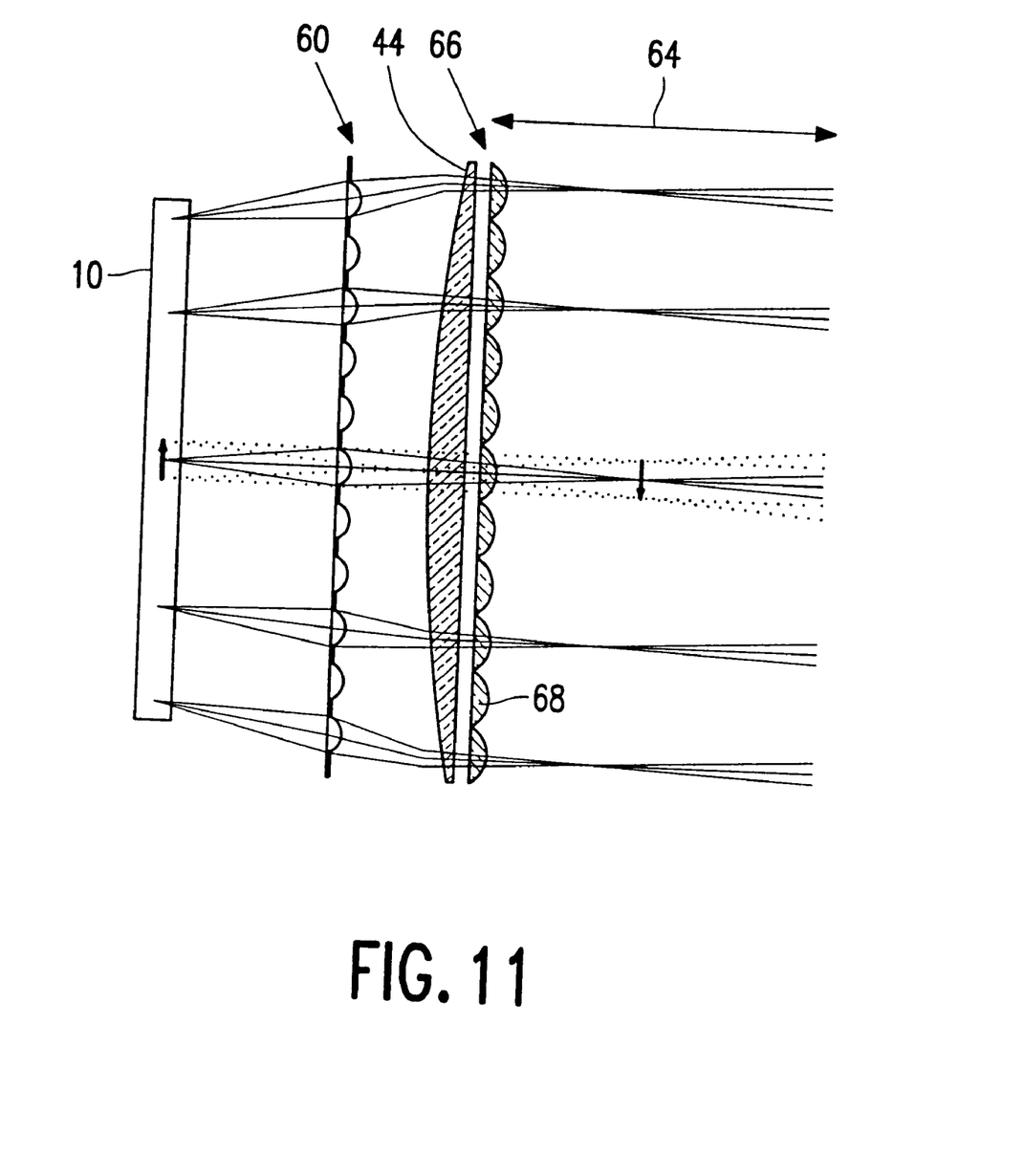

FIG. 11 shows a further modification which ensures that the beams associated with all pixels within the depth of focus 64 remain telecentric. This is particularly important for image sensing applications. The provision of telecentric beams within the depth of focus 64 enables a greater depth of focus to be achieved before false signals reduce the imaging quality. An additional microlens array 66 is used for this purpose, and may be combined with the field lens 44 as shown in FIG. 11. In this case, the pitch of the lens elements 68 of the lens array 66 corresponds to the pitch of respective image portions of the document to be imaged. Of course, the lens array 66 and the field lens 44 may be positioned in the opposite order.

Figure 12:
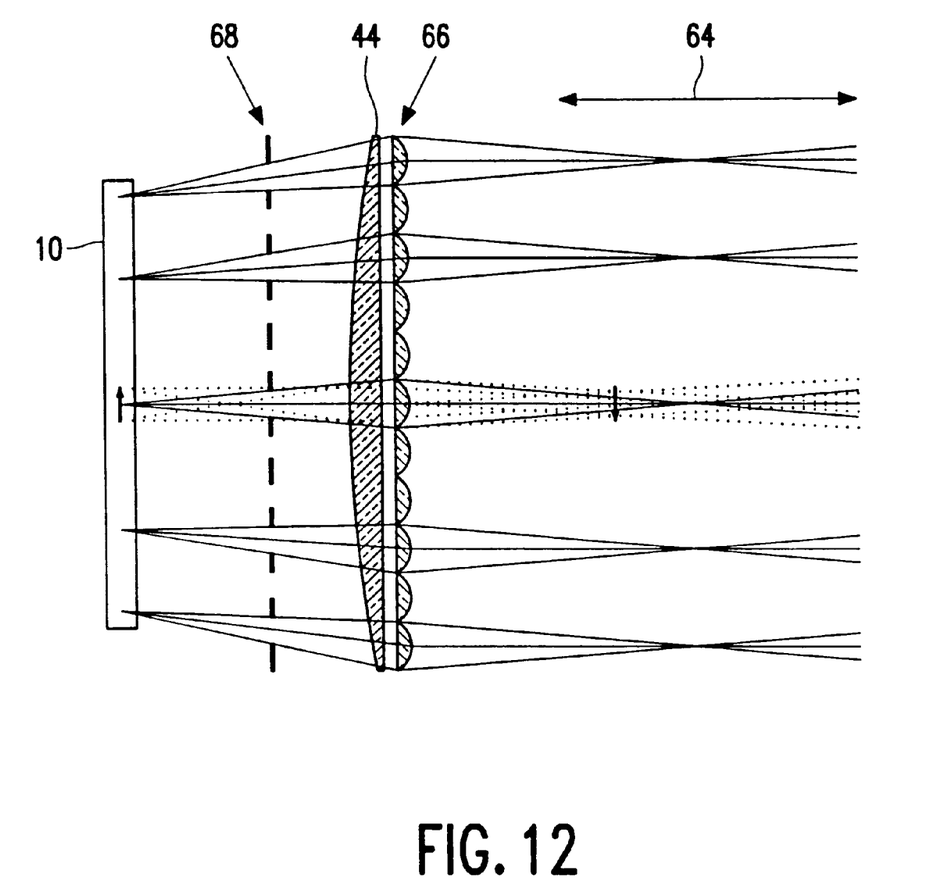

The function of this additional microlens array 66 may be combined with the function of the first microlens array 60. In such a case, if the first microlens array 60 is replaced by an array 68 of apertures, as shown in FIG. 12, then suitable choice of the focal length of the microlens array 66 will enable the system to remain telecentric in the active area. Although the microlenses 66 may abut, the value of a is reduced by the apertures of the array 68.

Figure 13:
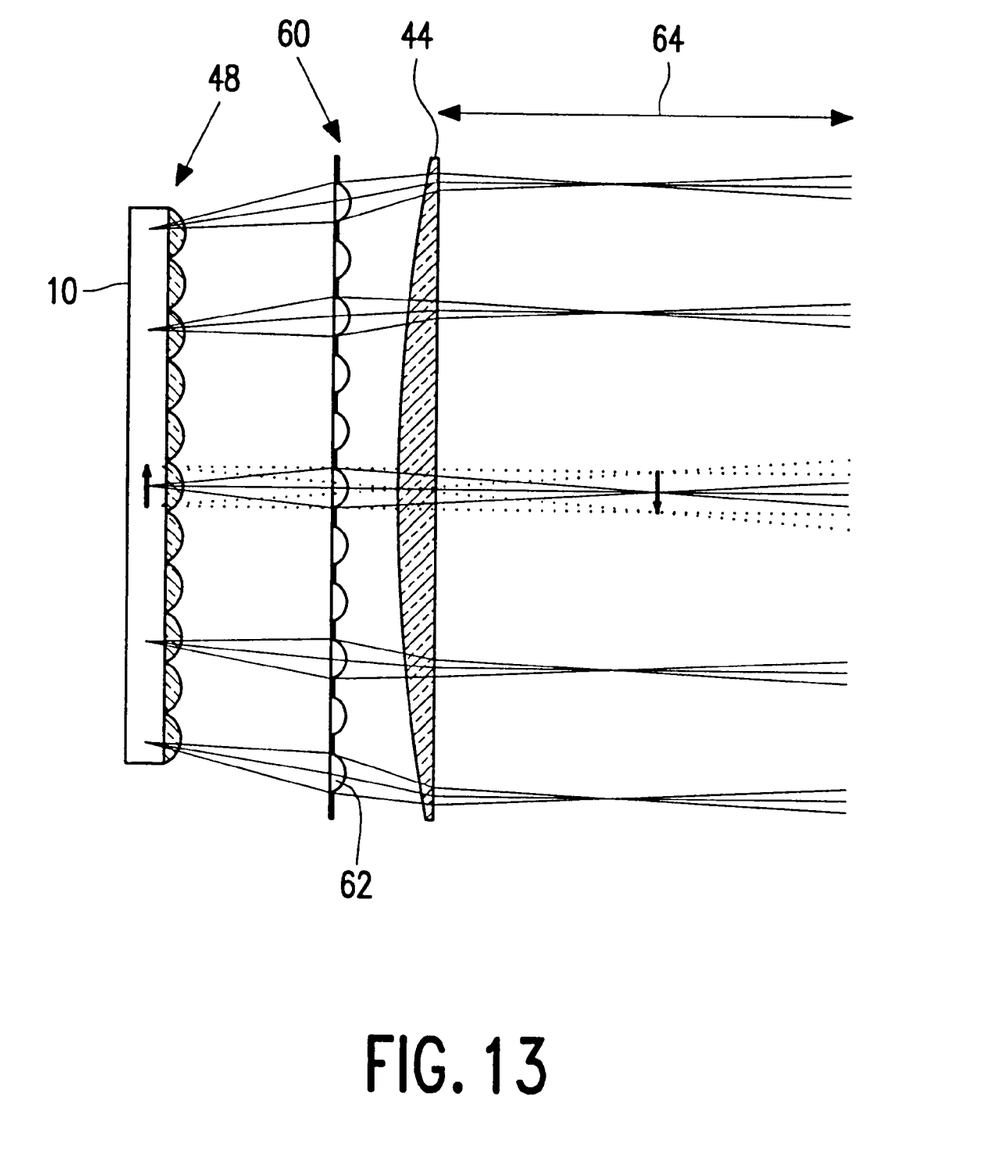

The arrangement of FIG. 10 may, of course, be modified to ensure parallel and normal light entry to each pixel, by using a microlens array with similar function to the microlens array 48 of FIG. 4. This results in the arrangement shown in FIG. 13. The arrangement may also be combined with a diverging field lens 46 as shown in FIG. 2.

As discussed above, for an image sensor with a group of pixels associated with each microlens, the microlenses cause local inversion of the images, so that signal processing is required. It is therefore necessary to know precisely which individual pixels are associated with each lens element. This requires critical positioning of the lens array, to within an accuracy of the dimension of one pixel. Similarly, in the case of a display, the signals emitted by each pixel will need to be processed to ensure a continuous combined image, and it is again necessary to know the precise positioning of each microlens with respect to the pixels of the sub-arrays. This constraint may outweigh the advantages of producing larger microlens elements. A solution to this problem is to use an arrangement of multiple microlens arrays, which produce a non-inverted image of the group of pixels.

Figure 14:
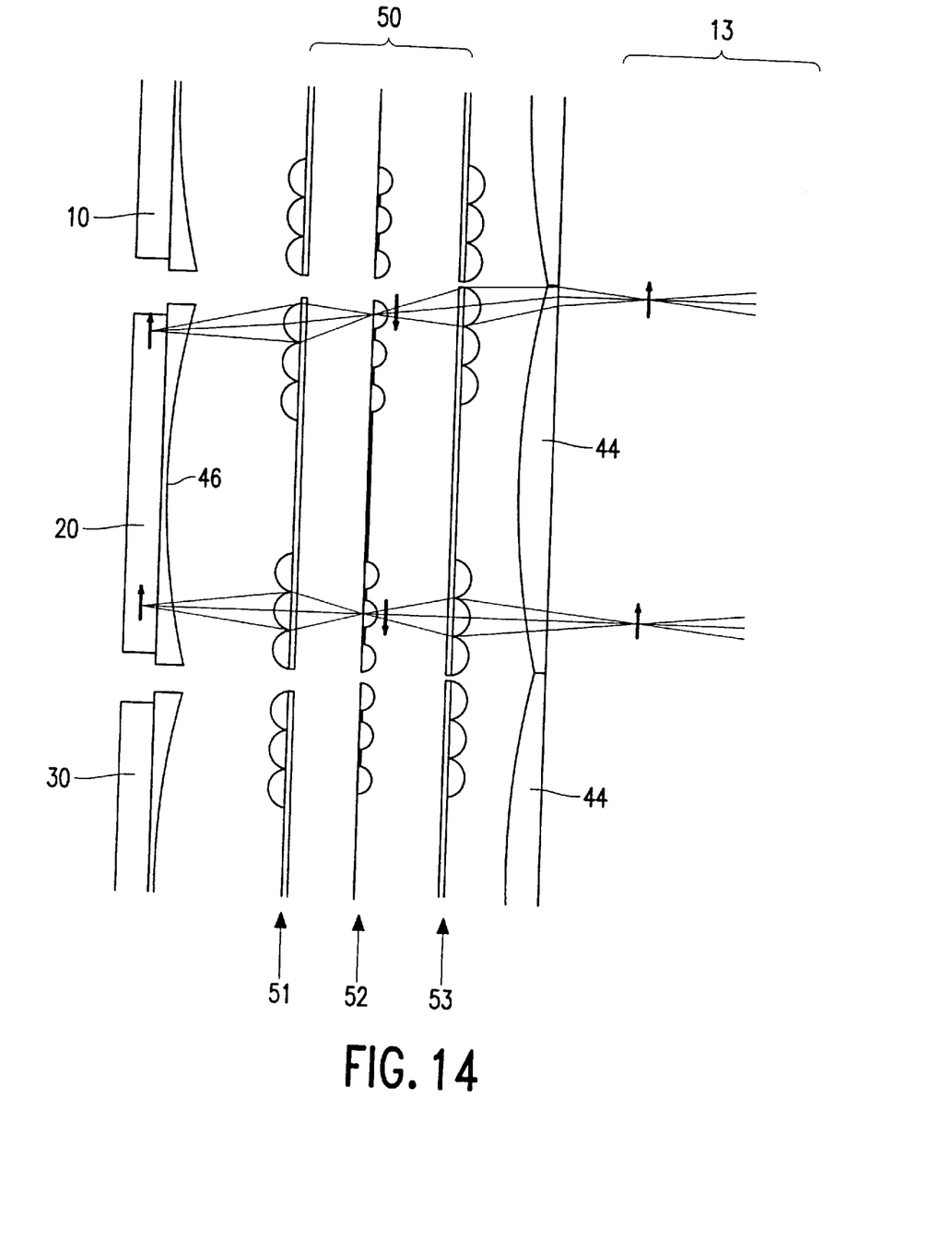

FIG. 14 shows an arrangement in which the microlens array 40 of previous embodiments has been replaced by a non-inverting optical arrangement 50.

In FIG. 14, three lens arrays 51, 52, 53 together form a non-inverted image of the original to be recorded. The lens elements of each array are associated with lens elements from each other array and are aligned with these associated lens elements on diverging optical axes. Thus, the microlenses in each array are arranged with a pitch greater than the pitch of the associated pixels, and the three arrays 51, 52, 53, each have different lens pitches. The pitch of lens elements of array 53 is greater than the pitch for array 52, which is in turn greater than the pitch for lens array 51.

The lens array 51 of lens elements forms an inverted image of the corresponding group of pixels close to lens array 52. The lens elements of the array 53 re-invert the image at the lens array 52, so as to form a non-inverted image in the active area 13. The purpose of the lens elements of the second lens array 52 is to prevent light spreading. If the lens array 52 were omitted, light from the lens elements of array 51 could reach several of the lens elements of array 53. To avoid overlapping images, the dimensions of the inverted image near lens 52 must be smaller than the pitch of the lenses in array 52.

The lens arrays 51, 52, 53 are shown on separate substrates. It will be apparent that arrays 51 and 52 could be formed on opposite sides of a single substrate of appropriate thickness. Alternatively, by reversing array 52, arrays 52 and 53 could be formed on a single substrate.

Yet another alternative is for the power in the lens array 52 to be divided between two arrays, each of which is then formed on the other side of either array 51 or array 53. Various other lens arrangements will be apparent to those skilled in the art.

FIG. 14 also shows the optional diverging lenses 46, as represented in the embodiment of FIG. 2, as well as field lenses 44. The field lenses 44 may also be associated with microlens arrays 66 such as represented in FIG. 11 for maintaining telecentric beams from all pixels. Additionally, or alternatively, a lens array having the function of the lens array 48 of FIG. 4, to ensure normal light entry to or emission from each pixel, may be employed.

When the invention is to be applied to an image sensor or a diffusely lit display, it may be necessary to employ measures to avoid the appearance of ghost images. These occur when light from a particular portion of the image can reach more than one (not necessarily adjacent) pixel of the image sensing array or active viewing area. Various baffles or arrangements of aperture arrays may be employed to prevent signals reaching pixels other than from the desired area. For example, EP 0 576 144 (U.S. Pat. No. 5,514,888) discloses a solid state image sensor which includes light shielding regions to prevent obliquely entering light reaching the imaging pixels. Such an arrangement may be employed in the present invention, although various other arrangements are possible, and will be understood by those skilled in the art. If each lens covers a large number of pixels, a system of walls arranged in a honeycomb may be used.

The optical arrangement 50 may itself incorporate measures for blocking ghost images. For example, the central lens array 52 may include opaque blocking material between the lens elements, particularly if the focusing of the lens array 51 enables the inverted image formed near to the lens elements of the array 52 to occupy a smaller dimension than the pitch of the lens elements in array 52. Typically an image dimension of about one half of the pitch is desirable.

From reading the present disclosure, other modifications will be apparent to persons skilled in the art. Such modifications may involve other features which are already known in the design and use of electrical or electronic circuits and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. An electrical device comprising an array of photoresponsive pixels, and having a plurality of electrical image sensor panels, each panel comprising a respective sub-array of said pixels, an array of lens elements being associated with each panel, and each lens element being associated with a group or one or more pixels of the sub-array, the lens elements being arranged with a pitch which is greater than the pitch of the associated groups of pixels.

2. An electrical device as claimed in claim 1, wherein each panel further comprises a converging field lens associated with all pixels of the sub-array, the field lenses of adjacent panels substantially abutting one another.

3. An electrical device as claimed in claim 2, wherein the array of lens elements is provided on a face of the field lens.

4. An electrical device as claimed in claim 1, wherein a diverging lens is provided adjacent each panel between the respective panel and the lens array, and associated with all pixels of the sub-array.

5. An electrical device as claimed in claim 1, wherein the lens elements of the lens array are spaced apart, opaque regions being provided between the lens elements.

6. An electrical device as claimed in any preceding claim, wherein a non-inverting lens arrangement is associated with each panel, the non-inverting lens arrangement including the lens array and at least one further lens array, the lens elements of the lens array and the at least one further lens array being arranged with different pitches, each greater than the pitch of the associated groups of pixels.

7. An electrical device as claimed in claim 6, wherein the non-inverting lens arrangement comprises three microlens arrays.

8. An electrical device as claimed in claim 1, wherein each lens element is associated with a plurality of pixels.

9. An electrical device as claimed in claim 8, wherein each panel further comprises a further array of lens elements arranged such that light incident on or emitted by each pixel of the panel is substantially telecentric.

10. An electrical device as claimed in claim 1, further comprising means for blocking the passage of light between each pixel and regions of the image to be sensed other than a region associated with the respective pixel.

11. An electrical device comprising an array of pixels, and having a plurality of electrical display panels, each panel comprising a respective sub-array of said pixels, an array of lens elements being associated with each panel, each lens element being associated with a group of one or more pixels of the sub-array, the lens elements being arranged with a pitch which is greater than the pitch of the associated groups of pixels, the lens elements forming an enlarged image of said sub-array of pixels in a display area opposite form said pixels.

12. An electrical device as claimed in claim 11, wherein each lens element is associated with a plurality of pixels.

13. An electrical device as claimed in claim 12, wherein each panel further comprises a further array of lens elements arranged such that light emitted by each pixel of the panel is substantially telecentric.

14. An electrical device as claimed in claim 11, wherein each panel further comprises a converging field lens associated with all pixels of the sub-array, the field lenses of adjacent panels substantially abutting one another.

15. An electrical device as claimed in claim 14, wherein the array or lens elements is provided on a face of the field lens.

16. An electrical device as claimed in claim 11, wherein a diverging lens is provided adjacent each panel between the respective panel and the lens array, and associated with all pixels of the sub-array.

17. An electrical device as claimed in claim 11, wherein the lens elements of the lens array are spaced apart, opaque regions being provided between the lens elements.

18. An electrical device as claimed in claim 11, wherein a non-inverting lens arrangement is associated with each panel, the non-inverting lens arrangement including the lens array and at least one further lens array, the lens elements of the lens array and the at least one further lens array being arranged with different pitches, each greater than the pitch of the associated groups of pixels.

19. An electrical device as claimed in claim 18, wherein the non-inverting lens arrangement comprises three microlens arrays.

20. An electrical device as claimed in claim 11, further comprising means for blocking the passage of light between each pixel and regions of the display panels other than a region associated with the respective pixel.

* * * * *